United States Patent
Lee et al.

(10) Patent No.: US 11,448,002 B2
(45) Date of Patent: Sep. 20, 2022

(54) TRUNK COVER FOR VEHICLE AND OPENING METHOD THEREOF

(71) Applicant: Continental Automotive GmbH, Hannover (DE)

(72) Inventors: Sanghun Lee, Gyeonggi-do (KR); Erwin Kessler, Bad Saulgau (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 549 days.

(21) Appl. No.: 16/520,826

(22) Filed: Jul. 24, 2019

(65) Prior Publication Data
US 2020/0056417 A1     Feb. 20, 2020

(30) Foreign Application Priority Data
Aug. 20, 2018 (KR) .................. 10-2018-0096971

(51) Int. Cl.
*E05F 15/73* (2015.01)
*B60J 5/12* (2006.01)
*B60J 5/10* (2006.01)

(52) U.S. Cl.
CPC .............. *E05F 15/73* (2015.01); *B60J 5/101* (2013.01); *B60J 5/12* (2013.01); *E05Y 2400/53* (2013.01); *E05Y 2900/548* (2013.01)

(58) Field of Classification Search
CPC ...... B60J 5/10; B60J 5/101; B60J 5/12; E05F 15/40; E05F 15/73
USPC .... 296/55, 56, 146.4, 146.8, 146.12, 146.13
See application file for complete search history.

(56) References Cited

U.S. PATENT DOCUMENTS

| | | | |
|---|---|---|---|
| 5,992,918 A * | 11/1999 | Gobart | B60J 5/0473 296/146.1 |
| 6,068,327 A | 5/2000 | Junginger | |
| 6,199,936 B1 | 3/2001 | Mac Farland | |
| 6,418,667 B1 | 7/2002 | Moon | |
| 6,585,307 B1 | 7/2003 | Queveau et al. | |
| 7,296,841 B2 | 11/2007 | Vassy | |
| 7,963,580 B2 | 6/2011 | Plettrichs et al. | |
| 2082/0038963 | 4/2002 | Moon | |
| 2007/0009648 A1 | 1/2007 | Hawkins | |
| 2010/0156141 A1 | 6/2010 | Mueller | |

(Continued)

FOREIGN PATENT DOCUMENTS

| | | | |
|---|---|---|---|
| DE | 20317018 U1 | 2/2004 | |
| EP | 1170160 A2 * | 1/2002 | ............... B60J 5/12 |

(Continued)

OTHER PUBLICATIONS

Notice of Reasons for Refusal for Japanese Application No. 2019-142937, dated Jun. 19, 2020, with translation, 8 pages.

(Continued)

*Primary Examiner* — Jason S Daniels
(74) *Attorney, Agent, or Firm* — RatnerPrestia

(57) ABSTRACT

A trunk cover for a vehicle includes an upper panel covering one portion of a loading space part formed in a vehicle, a lower panel disposed continuously with the upper panel and covering the other portion of the loading space part; a main body connection part connecting the upper panel to a main body of the vehicle, and a panel connection part connecting the upper panel and the lower panel so that a length formed by the upper panel and the lower panel is variable when opening the loading space part.

10 Claims, 10 Drawing Sheets

(56) References Cited

U.S. PATENT DOCUMENTS

| | | | |
|---|---|---|---|
| 2011/0248820 A1 | 10/2011 | Gehin | |
| 2013/0099523 A1* | 4/2013 | Brown | B60J 5/0473 296/146.9 |
| 2016/0281410 A1 | 9/2016 | Schanz et al. | |
| 2017/0327052 A1 | 11/2017 | Singer | |

FOREIGN PATENT DOCUMENTS

| | | |
|---|---|---|
| EP | 3269913 A1 | 1/2018 |
| JP | 0660512 U | 8/1994 |
| JP | 2000043577 A | 2/2000 |
| JP | 2002067697 A | 3/2002 |
| JP | 2005511925 A | 4/2005 |
| JP | 2005299232 A | 10/2005 |
| JP | 2005336934 A | 12/2005 |
| JP | 2008534358 A | 8/2008 |
| JP | 2012504716 A | 2/2012 |
| JP | 2015123927 A | 7/2015 |
| KR | 20000009550 A | 2/2000 |
| KR | 2002015468 A | 2/2002 |
| KR | 20030097367 A | 12/2003 |
| KR | 100725907 B1 | 5/2007 |
| KR | 20100069245 A | 6/2010 |
| KR | 20120062528 A | 6/2012 |

OTHER PUBLICATIONS

Chinese Office Action for Chinese Application No. 201910762173.X. dated Aug. 4, 2021, with translation, 15 pages.
Japanese Decision to Grant a Patent for Japanese Application No. 2019-142937, dated Jan. 8, 2021, with translation, 5 pages.

* cited by examiner

TRUNK COVER FOR VEHICLE AND OPENING METHOD THEREOF

CROSS REFERENCE TO RELATED APPLICATIONS

This application claims priority to Korean Patent Application No. 10-2018-0096971, filed Aug. 20, 2018, the contents of such application being incorporated by reference herein.

FIELD OF THE INVENTION

The present invention relates to a trunk cover for a vehicle and an opening method thereof, and more particularly, to a trunk cover for a vehicle which covers a loading space part of a vehicle and an opening method thereof.

BACKGROUND OF THE INVENTION

In general, a vehicle is provided with a loading space part in which luggage can be loaded, and a trunk cover covering the loading space part is rotatably installed. Such a trunk cover consists of one panel member. If there is an obstacle within a radius range corresponding to the length of the trunk cover, the obstacle will inevitably interfere with the trunk cover.

If a sufficient distance away from a wall to the rear or other vehicles is not established when the vehicle is parked or stopped, the rotatable range of the trunk cover is remarkably reduced due to an obstacle, and thus, it may be difficult to load or unload luggage in and out of the loading space part, and the trunk cover or the luggage may be damaged by interference with the obstacle. Thus, it is inconvenient that it is necessary to park and stop the vehicle in consideration of an opening line of the trunk cover and the size of the luggage, and thus, inconvenience or accidents may be caused by interfering with a traveling line of another vehicle.

The background art of the present invention has been described in Korean Laid-Open Patent Publication No. 2010-0069245, incorporated herein by reference, (Published Jun. 24, 1998, Title of the Invention: Trunk Cover for Vehicle).

SUMMARY OF THE INVENTION

Problem to be Solved

An aspect of the present invention is a trunk cover for a vehicle and an opening method thereof, which are capable of further reducing restrictions due to interference with an obstacle when opening a loading space part.

Means for Solving the Problem

A trunk cover for a vehicle according to an aspect of the present invention is characterized by including: an upper panel covering one portion of a loading space part formed in a vehicle; a lower panel disposed continuously with the upper panel and covering the other portion of the loading space part; a main body connection part connecting the upper panel to a main body of the vehicle; and a panel connection part connecting the upper panel and the lower panel so that a length formed by the upper panel and the lower panel is variable when opening the loading space part.

The panel connection part is characterized by including a hinge device rotatably connecting the lower panel to the upper panel.

Also, an aspect of the present invention is characterized by further including: a sensor unit sensing an obstacle; and a control unit controlling at least one rotation angle of the upper panel and the lower panel according to a sensing signal of the sensor unit when opening the loading space part.

The sensor unit is characterized by including a rear sensor sensing an obstacle to the rear of the vehicle.

The sensor unit is characterized by including an upper sensor sensing an obstacle above the vehicle.

The control unit is characterized by including: a sensor signal input part receiving an input of a signal sensed by the sensor unit; an operation determination part determining a rotation angle and order of the upper panel and the lower panel according to position information of the obstacle, which is input through the sensor signal input part; and an operation control part controlling an operation of the main body connection part or the panel connection part according to the results determined by the operation determination part.

An opening method of a trunk cover for a vehicle according to an aspect of the present invention is characterized by including: an opening standby step of installing an upper panel and a lower panel to cover a loading space part formed in a vehicle; a mode determination step of determining a method in which the lower panel is operated while the upper panel is opened; and a panel opening step of moving at least one side of the upper panel and the lower panel to open the loading space part.

The mode determination step is characterized in that, when moving the upper panel, any one of a first mode in which the lower panel is maintained in a state of being hung by its own weight, a second mode in which the lower panel is moved at a set speed so as to be folded toward the upper panel, and a third mode in which a relative angle between the upper panel and the lower panel is constantly maintained is determined.

The panel opening step is characterized by including a first opening step of moving the upper panel to open the loading space part.

The first opening step is characterized in that, when moving the upper panel, when a distance between the upper panel or the lower panel and the obstacle is within a set distance, the movement of the upper panel is stopped.

The panel opening step is characterized by further including a second opening step of moving the lower panel after the first opening step to further open the loading space part.

The second opening step is characterized in that, when rotating the lower panel, when a distance between the upper panel or the lower panel and the obstacle is within the set distance, the rotation of the lower panel is stopped.

Advantageous Effects of the Invention

In the trunk cover for a vehicle and the opening method thereof according to an aspect of the present invention, the length formed by the upper panel and the lower panel is not constantly fixed but widely varies in consideration of the position and the distance of the obstacle to allow the trunk cover for a vehicle to open. Thus, when opening the loading space part, the restriction due to interference with the obstacle may be further reduced.

Therefore, by means of the trunk cover for a vehicle and the opening method thereof according to an aspect of the present invention, it may be possible to prevent the conventional complication, in which the vehicle must be parked or stopped with sufficient space away from the obstacle in consideration of the moving line of the trunk cover, and the inconvenience or accidents, which are caused by the interference with the traveling line of another vehicle because the distance from the obstacle to the rear is further extended in the limited space, from occurring.

DETAILED DESCRIPTION OF THE PREFERRED EMBODIMENTS

Figure 1:
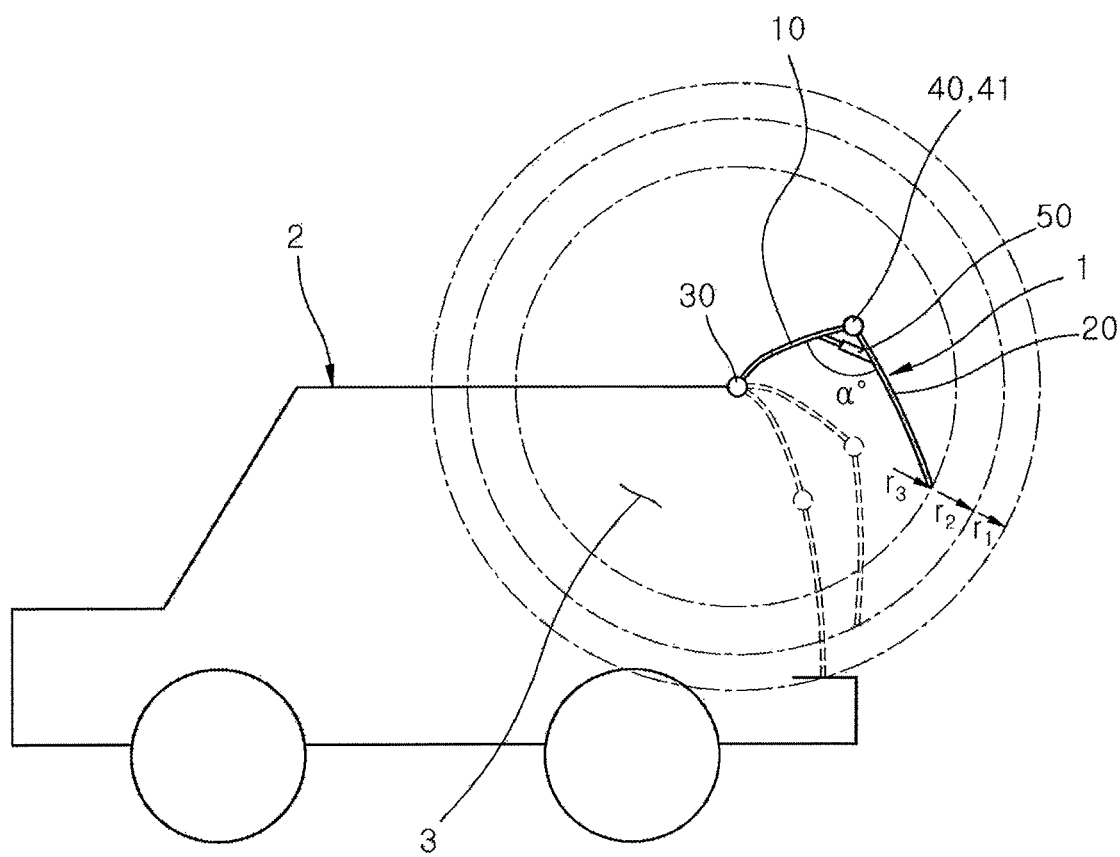
FIG. 1 is a schematic view schematically illustrating a trunk cover for a vehicle according to a first embodiment of the present invention.

Hereinafter, embodiments of a trunk cover for a vehicle and an opening method thereof according to an aspect of the present invention will be described with reference to the accompanying drawings. In this process, the thickness of lines or the size of the components shown in the drawings may be exaggerated for the clarity and ease of understanding of the description. In addition, the following terms are defined in consideration of the functions of an aspect of the present invention, which may vary depending on the intention or practice of a user or an operator. Therefore, the definitions of these terms should be based on the content throughout the whole of this specification.

FIG. 1 is a schematic view schematically illustrating a trunk cover for a vehicle according to a first embodiment of the present invention.

Referring to FIG. 1, a trunk cover (1) for a vehicle according to a first embodiment of the present invention includes an upper panel (10), a lower panel (20), a main body connection part (30), a panel connection part (40), and an angle maintenance part (50).

The upper panel (10) has a panel shape that can cover one portion of a loading space part (3) formed in a vehicle (2). The lower panel (20) is disposed below the upper panel (10) and covers the other portion of the loading space part (3). The main body connection part (30) connects the upper panel (10) to a main body of the vehicle (2). The panel connection part (40) connects the upper panel (10) and the lower panel (20) so that a length formed by the upper panel (10) and the lower panel (20) is variable when opening the loading space part (3). The angle maintenance part (50) connects the upper panel (10) and the lower panel (20) so that a relative angle of the lower panel (20) with respect to the upper panel (10) is constantly maintained.

In the description of an aspect of the present invention, the upper panel (10) and the lower panel (20) are respectively named to be divided into an upper portion disposed at an upper side and a lower portion disposed at a relatively lower side with respect to the main body connection part (30) that is a connection part to the main body of the vehicle (2), but it does not mean that the upper panel (10) is located high on the upper side of the lower panel (20). Thus, when the trunk cover (1) for a vehicle according to an aspect of the present invention is installed to be flat, the upper panel (10) is connected to the main body of the vehicle (2), and the lower panel (20) is connected to the upper panel (10).

Here, a length formed by the upper panel (10) and the lower panel (20) means a straight-line distance from an end portion of the upper panel (10) to an end portion of the lower panel (20). That is, in FIG. 1, the length means a straight-line distance from the upper end portion of the upper panel (10) or the main body connection part (30) to the lower end portion of the lower panel (20). In the state of covering the loading space part (3), the upper panel (10) and the lower panel (20) have a length corresponding to $r_1$.

When the lower panel (20) Is rotated at a set angle toward the upper panel (10), the length formed by the upper panel (10) and the lower panel (20) is further reduced to $r_2(<r_1)$. Here, when the lower panel (20) is rotated more than the set angle toward the upper panel (10), the length formed by the upper panel (10) and the lower panel (20) is further reduced to $r_3(<r_2<r_1)$.

In the state in which the loading space part (3) is covered by the upper panel (10) and the lower panel (20), when the panel connection part (40) is maintained in a stopped and fixed state, and only the main body connection part (30) is operated, i.e., when the upper panel (10) is rotated upward while constantly maintaining a relative angle between the upper panel (10) and the lower panel (20), the upper panel (10) and the lower panel (20) perform an opening operation in which the upper panel and the lower panel are rotated upward at a rotation radius corresponding to $r_1$.

In the state in which the loading space part (3) is covered by the upper panel (10) and the lower panel (20), when the lower panel (20) is maintained in a state of being hung on the panel connection part (40) without driving force or external force, and only the main body connection part (30) is operated, i.e., when the upper panel (10) is rotated upward while maintaining a state in which the lower panel (20) hangs due to its own weight, the lower panel (20) is rotated upward together with the upper panel (10) at a rotation radius corresponding to $r_2$ while maintaining a certain angle with respect to the ground. Thereafter, when the upper panel (10) is further rotated upward, the lower panel (20) becomes further folded up toward the upper panel (10) while the rotation radius gradually decreases further.

In the state in which the loading space part (3) is covered by the upper panel (10) and the lower panel (20), when the main body connection part (30) and the panel connection part (40) are operated together, i.e., when the upper panel (10) is rotated upward while the lower panel (20) is folded toward the upper panel (10) by a set angle (α°), the rotation radius is reduced from $r_1$ to $r_3$.

If the upper panel (10) and the lower panel (20) according to an aspect of the present invention have a panel shape that can cover the loading space part (3), the upper panel (10) and the lower panel (20) are not limited to a specific structure and shape. Also, if the main body connection part (30) according to an aspect of the present invention can rotatably connect the upper end portion of the upper panel (10) to the main body of the vehicle (2), the main body connection part (30) includes a manually actuated structure or an automatically actuated structure including an actuator, and since the main body connection part (30) includes the well-known techniques of connecting different members to each other and is not limited to a specific structure and shape, a detailed description with respect to the structure and operation thereof will be omitted.

The panel connection part (40) may include a hinge device rotatably connecting the lower panel (20) to the upper panel (10), and the hinge device may include a shaft member and a bracket member. For example, the hinge device of the panel connection part (40) according to the first embodiment of the present invention may include an upper connection part, a lower connection part, and a hinge part.

The upper connection part and the lower connection part are respectively connected to the upper panel (10) and the lower panel (20), and the hinge part hinge-connects the upper connection part and the lower connection part. A hinge shaft part may include a shaft member, and the upper connection part and the lower connection part may include the bracket member rotatably coupled to the shaft member. If the panel connection part (40) according to an aspect of the present invention can rotatably connect the lower panel (20) to the upper panel (10), the panel connection part (40) includes a manually actuated structure or an automatically actuated structure including an actuator, and since the panel connection part (40) includes the well-known techniques with respect to the hinge device and is not limited to a specific structure and shape, a detailed description with respect to the structure and operation thereof will be omitted.

The angle maintenance part (50) connects the upper panel (10) and the lower panel (20) so that a relative angle of the lower panel (20) with respect to the upper panel (10) is constantly maintained. A gas spring, a cylinder, or the like having a structure that has internal force by means of pneumatic pressure, oil pressure, or the like and is capable of being stretched and deformed in length may be applied as the angle maintenance part (50).

Since the angle maintenance part (50) maintains a set length in a state in which both ends portions thereof are respectively coupled to the upper panel (10) and the lower panel (20), the lower panel (20) may be supported so as to be able to maintain an adjusted angle with respect to the upper panel (10). Also, if necessary, a user may apply external force for pulling or pushing the lower panel (20) to manually adjust the length of the angle maintenance part (50).

Although the angle maintenance part (50) has a bar shape and has a structure in which both the end portions thereof are coupled to the upper panel (10) and the lower panel (20) in FIG. 1, the angle maintenance part (50) according to an aspect of the present invention is not limited thereto and may be coupled to or built into the panel connection part (40). For example, the angle maintenance part (50) may be coupled to the hinge shaft part to support or maintain the upper connection part and the lower connection part at the set angle by means of pneumatic pressure, oil pressure, or the like.

Figure 2:
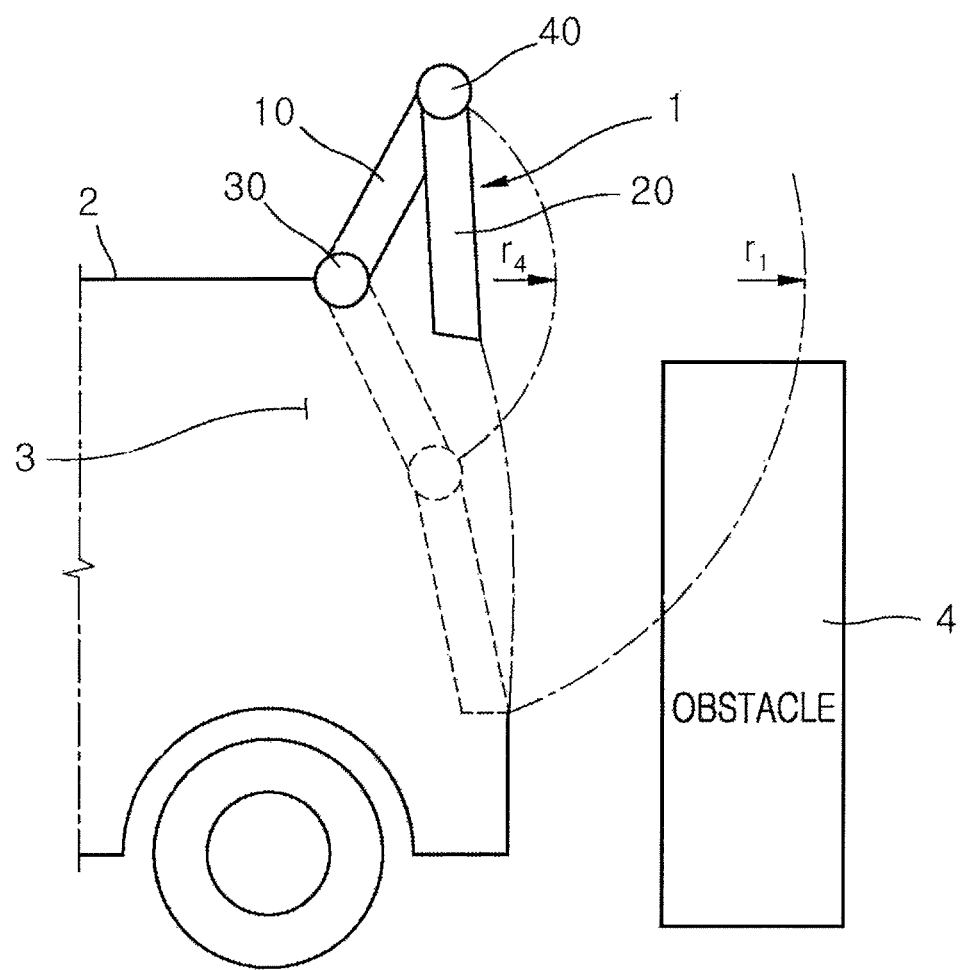
FIG. 2 is a diagram of an aspect of the invention in use illustrating an example of opening the trunk cover for a vehicle without interfering with an obstacle to the rear according to the first embodiment of the present invention to explain same.
Figure 3A:
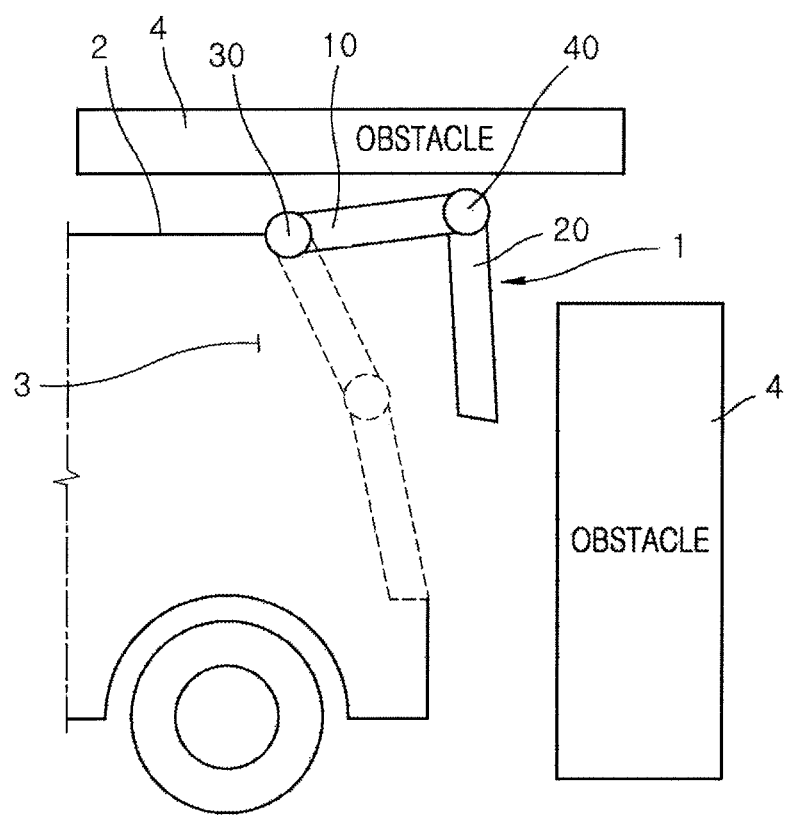
FIGS. 3A and 3B are diagrams of an aspect of the invention in use illustrating an example of opening the trunk cover for a vehicle without interfering with obstacles above or to the rear according to the first embodiment of the present invention to explain same.
Figure 3B:
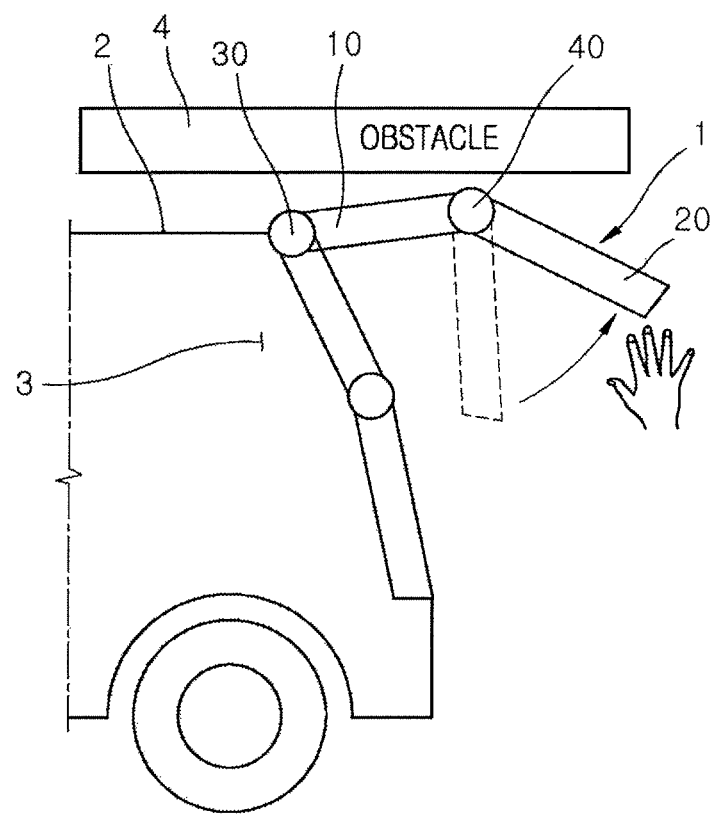

FIG. 2 is a diagram of an aspect of the invention in use illustrating an example of opening the trunk cover for a vehicle without interfering with an obstacle to the rear according to the first embodiment of the present invention to explain same, and FIGS. 3A and 3B are diagrams of an aspect of the invention in use illustrating an example of opening the trunk cover for a vehicle without interfering with obstacles above or to the rear according to the first embodiment of the present invention to explain same.

Referring to FIG. 2, the upper panel (10) and the lower panel (20) forms a length of $r_1$ in the state of covering the loading space part (3). Thus, when the upper panel (10) is rotated with respect to the main body connection part (30) while constantly maintaining the relative angle between the upper panel (10) and the lower panel (20), the upper panel has a circular moving line having a radius corresponding to $r_1$ to interfere with an obstacle to the rear (4). Here, the obstacle to the rear (4) may be a structure such as a wall, a thing, another vehicle, or a person including the user.

When the lower panel (20) Is folded toward the upper panel (10) with respect to the panel connection part (40), or the upper panel (10) is rotated upward while maintaining the state in which the lower panel (20) is hung on the lower portion of the upper panel (10) in a state of hanging due to just gravity, i.e., its own weight without any other driving force or external force, as illustrated in FIG. 2, the moving lines of the upper panel (10) and the lower panel (20) are remarkably reduced to a range corresponding to the length $r_4$ of the upper panel (10). Thus, the upper panel (10) and the lower panel (20) may be moved upward without interfering with the obstacle to the rear (4) to be able to smoothly open the loading space part (3).

Referring to FIG. 3A, when there is an additional obstacle (4) above the vehicle (2), the lower panel (20) may be folded toward the upper panel (10), or the upper panel (10) may be primarily rotated up to a height at which the upper panel does not interfere with the obstacle above (4) In the state of being hung to hang due to gravity to open a lower portion of the loading space part (3). In the case of small luggage or opening for ventilation, when it is desired to open only a portion of the loading space part (3), it is possible to achieve the objective quickly and efficiently while opening only a portion of the loading space part (3) as described above, i.e., while omitting the process of rotating the lower panel (20) so as to be unfolded further from the upper panel (10).

When the user manually rotates the upper panel (10), pushing or lifting force may be applied while gripping a handle provided on the lower panel (20) to apply rotation force to the upper panel (10), and the actuators of the main body connection part (30) and the panel connection part (40) may be selectively actuated by an operation such as the pressing of a button to rotate the upper panel (10) at the set angle. If necessary, as illustrated in FIG. 3B, the lower panel (20) may be secondarily rotated by using manpower or another driving force while maintaining the position of the upper panel (10), and the loading space part (3) may be maximally opened.

Figure 4:
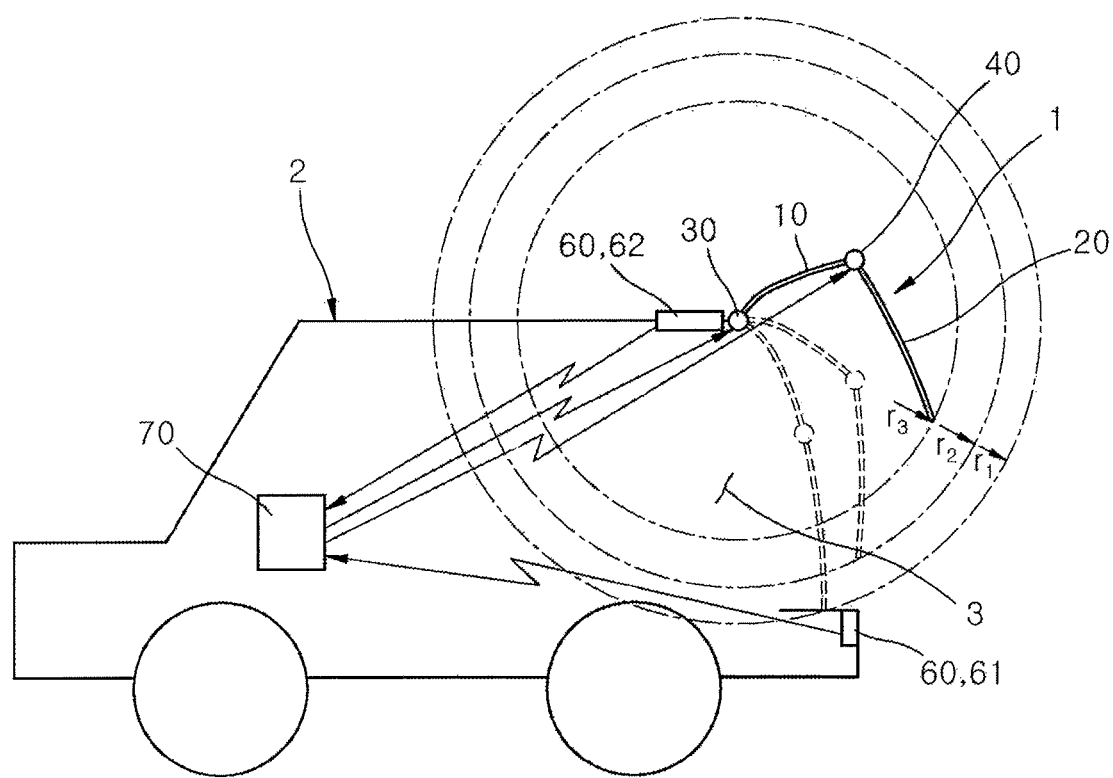
FIG. 4 is a schematic view schematically illustrating a trunk cover for a vehicle according to a second embodiment of the present invention.
Figure 5:
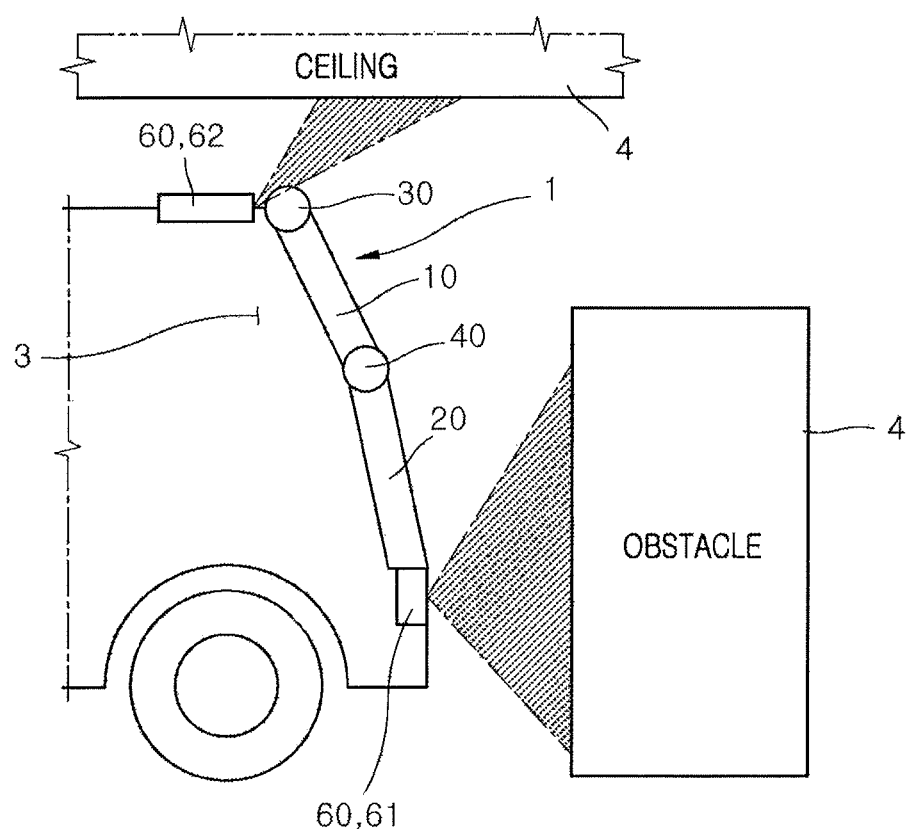
FIG. 5 is a conceptual view illustrating an operation of sensing an obstacle by using a sensor unit of the trunk cover for a vehicle according to the second embodiment of the present invention to explain same.
Figure 6:
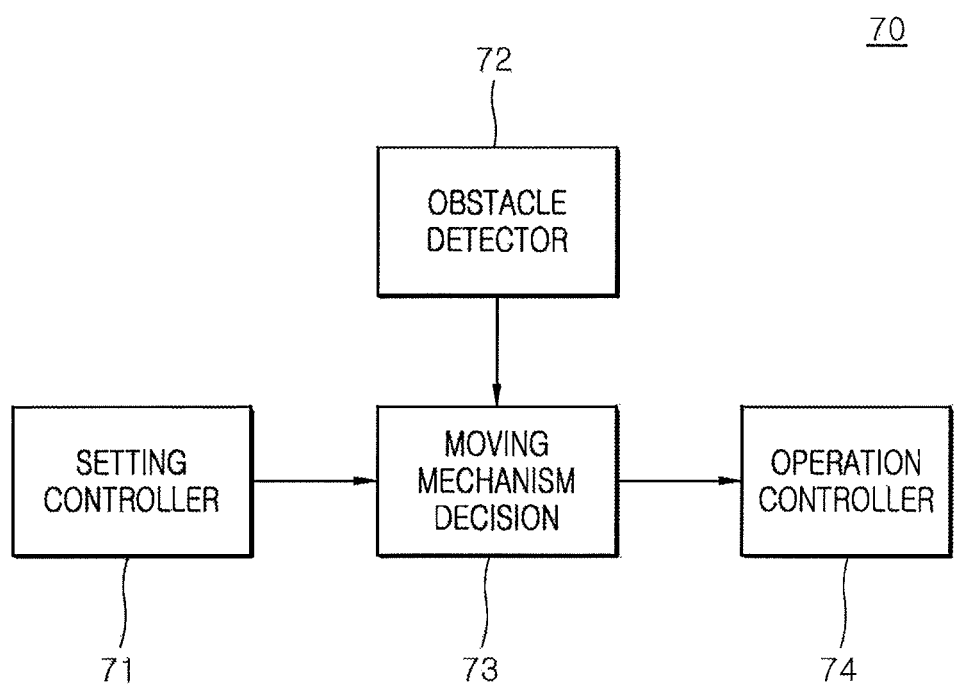
FIG. 6 is a conceptual view illustrating a control unit of the trunk cover for a vehicle according to the second embodiment of the present invention to explain same.

FIG. 4 is a schematic view schematically illustrating a trunk cover for a vehicle according to a second embodiment of the present invention, FIG. 5 is a conceptual view illustrating an operation of sensing an obstacle by using a sensor unit of the trunk cover for a vehicle according to the second embodiment of the present invention to explain same, and FIG. 6 is a conceptual view illustrating a control unit of the trunk cover for a vehicle according to the second embodiment of the present invention to explain same.

Next, a trunk cover (1) for a vehicle according to a second embodiment of the present invention will be described with reference to FIGS. 4 to 7B. In the description of the trunk cover (1) for a vehicle according to the second embodiment of the present invention, detailed descriptions of portions duplicated with the trunk cover (1) for a vehicle according to the first embodiment of the present invention, which are illustrated in FIGS. 1 to 3, will be omitted.

Referring to FIG. 4, when compared to the trunk cover (1) for a vehicle according to the first embodiment of the present invention, the trunk cover (1) for a vehicle according to the second embodiment of the present invention may further include a sensor unit (60) sensing an obstacle (4) and a control unit (70) controlling a rotation angle of at least one side of an upper panel (10) and a lower panel (20) according to a sensing signal of the sensor unit (60) when opening a loading space part (3).

The sensor unit (60) may include a rear sensor (61) and an upper sensor (62). A sensor device, a camera, or the like may be applied as the sensor unit (60). The rear sensor (61) is installed on a rear portion of a main body of the vehicle (2) or the trunk cover (1) of a vehicle according to an aspect of the present invention so that a sensing direction thereof is directed backward. The upper sensor (62) is installed on an upper portion of the main body of the vehicle (2) or the trunk cover (1) of a vehicle according to an aspect of the present invention so that the sensing direction thereof is directed upward.

As Illustrated in FIG. 5, an obstacle (4) to the rear of the vehicle (2) may be automatically sensed by using the rear sensor (61), and an obstacle (4) above the vehicle (2) may be automatically sensed by using the upper sensor (62). The sensor unit (60) may be an exclusive sensor for operating the trunk cover (1) for a vehicle according to an aspect of the present invention or a sensor that is previously installed in the vehicle (2) for parking convenience and to guarantee a safe distance.

Referring to FIG. 6, the control unit (70) according to the second embodiment of the present invention includes a method setting part (71), a sensor signal input part (72), an operation determination part (73), and an operation control part (74).

The method setting part (71) may be used to set selection of an automatic or manual opening method, a sensing method of the sensor unit (60), and whether rotation of the lower panel (20) is activated or not according to usage environment of the vehicle (2). The sensor signal input part (72) receives an input of a signal sensed by the sensor unit (60). The operation determination part (73) determines a rotation angle and order of the upper panel (10) and the lower panel (20) according to position information of the obstacle (4), which is input through the sensor signal input part (72). The operation control part (74) controls an operation of the main body connection part (30) or the panel connection part (40) according to the result determined by the operation determination part (73).

When the automatic or manual opening method is selected in the method setting part (71), the automatic opening method, in which the upper panel (10) and the lower panel (20) are moved by using the actuator driven by pneumatic pressure, electricity, etc., i.e., the actuator installed in the main body connection part (30) and the panel connection part (40), may be set. Also, when it is desired to open the trunk cover (1) for a vehicle just manually due to the reasons of convenience of the user and sensing errors of the sensor unit (60), the manual opening method in which the user directly moves the upper panel (10) and the lower panel (20) may be set.

When the sensing method of the sensor unit (60) is set by the method setting part (71), sensors for sensing the obstacle (4) within moving lines of the upper panel (10) and the lower panel (20), which includes a rear sensor (61) and an upper sensor (62), may be selected as sensing means, and a normal operation, an operation in a specific situation, or the like may be selected.

When whether the rotation of the lower panel (20) Is activated or not is set by the method setting part (71), a relative angle of the lower panel (20) with respect to the upper panel (10) may be adjusted according to user's preference as described above to activate the rotation of the lower panel (20), and the rotation of the lower panel (20) may be set to be deactivated so that the relative angle of the lower panel (20) with respect to the upper panel (10) is always constant.

When the rotation angle of the upper panel (10) is determined by the operation determination part (73), the angle is determined so as not to interfere with obstacles above or to the rear (4) on the basis of the position information about the obstacles (4) that is Input through the sensor signal input part (72).

Figure 7A:
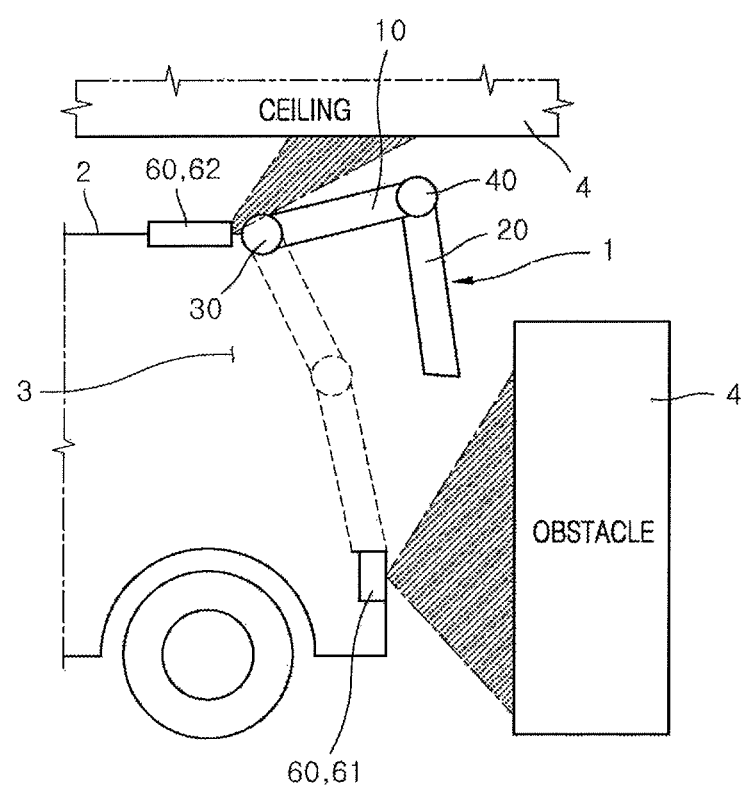
FIGS. 7A and 7B are diagrams of an aspect of the invention in use illustrating an example of opening the trunk cover for a vehicle without interfering with obstacles above or to the rear according to the second embodiment of the present invention to explain same.
Figure 7B:
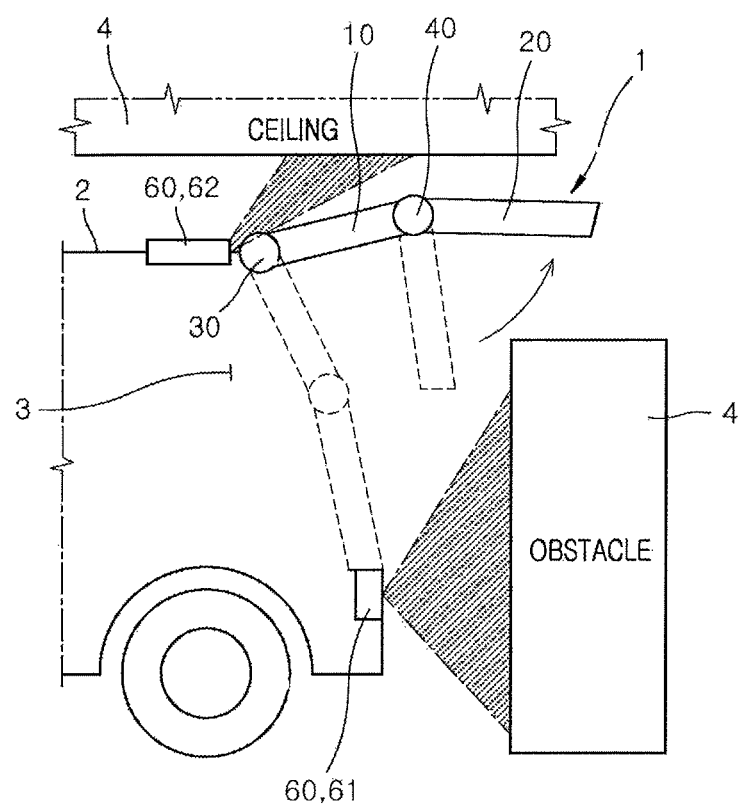

FIGS. 7A and 7B are diagrams of an aspect of the invention in use illustrating an example of opening the trunk cover for a vehicle without interfering with obstacles above or to the rear according to the second embodiment of the present invention to explain same.

Although the embodiment in which the loading space part (3) is directly and manually opened by the user while moving the upper panel (10) and the lower panel (20) is illustrated in FIGS. 2 and 3, by means of the trunk cover (1) according to the second embodiment of the present invention, the opening operation of the upper panel (10) and the lower panel (20) may be automatically implemented in consideration of the interference with the obstacles (4) located to the rear and above as illustrated in FIGS. 7A and 7B by using the sensor unit (60) and the control unit (70).

When the order of the upper panel (10) and the lower panel (20) is determined by the operation determination part (73), while the upper panel (10) is moved, any one of a first mode in which the lower panel (20) is maintained in the state of being hung by its own weight, a second mode (FIG. 7A) In which the lower panel (20) is moved at a set speed so as to be folded toward the upper panel (10), and a third mode in which the relative angle between the upper panel (10) and the lower panel (20) is constantly maintained may be determined. Also, in a state in which the opening operation of the upper panel (10) is stopped, the lower panel (20) may be determined to be further moved manually or automatically (FIG. 7B).

Figure 8:
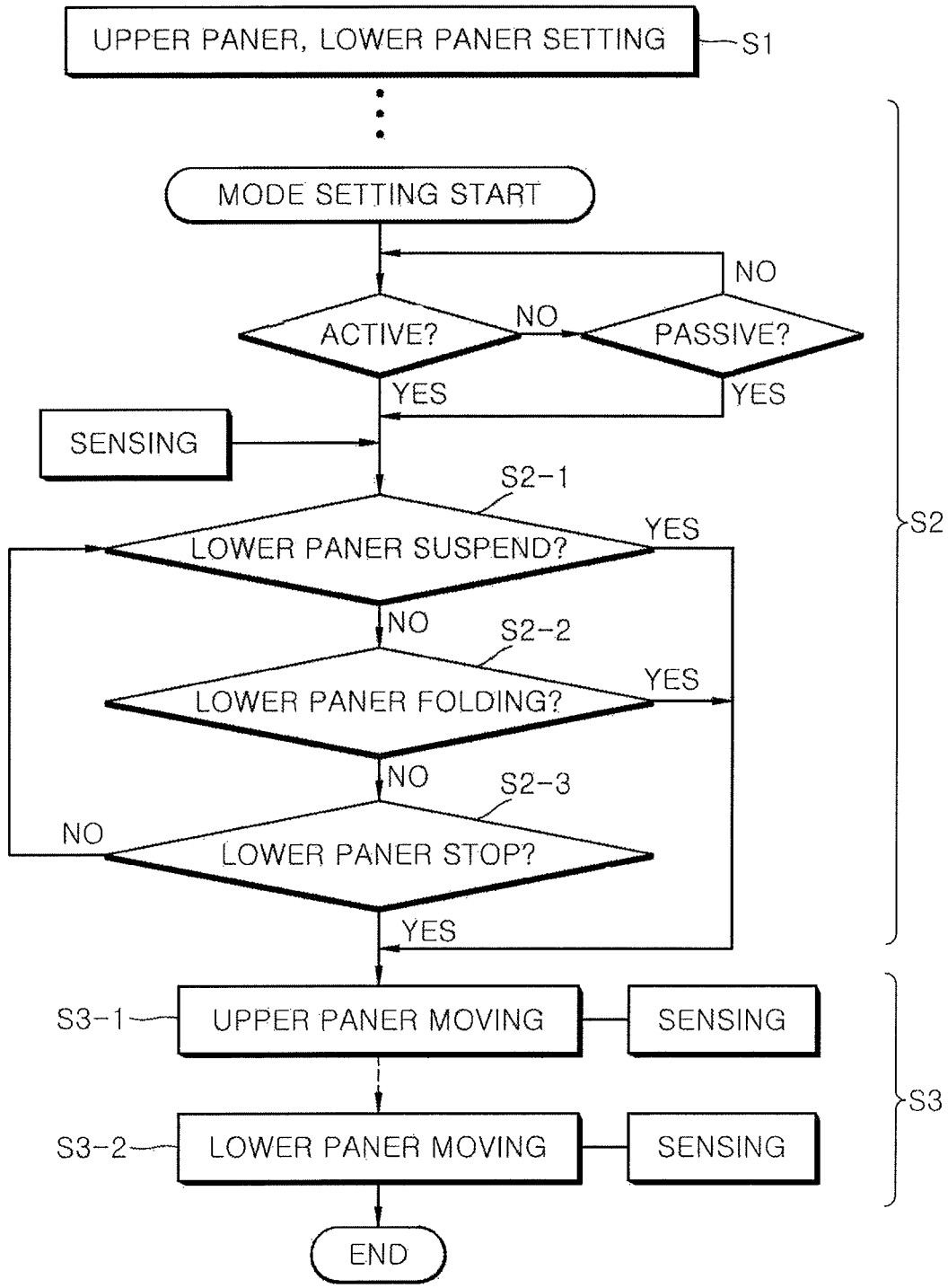
FIG. 8 is a flowchart illustrating an opening method of the trunk cover for a vehicle according to the first embodiment of the present invention.

FIG. 8 is a flowchart illustrating the opening method of the trunk cover for a vehicle according to the first embodiment of the present invention.

Referring to FIG. 8, according to the opening method of the trunk cover (1) for a vehicle according to the first embodiment of the present invention, an opening standby step (S1), a mode determination step (S2), and a panel opening step (S3) are sequentially performed to open the trunk cover (1) for a vehicle.

In the opening standby step (S1), the upper panel (10) and the lower panel (20) are installed to respectively cover the upper portion and the lower portion of the loading space part (3) formed in the vehicle (2). In the mode determination step (S2), setting of the automatic or manual opening mode and determination of the method by which the lower panel (20) is operated while the upper panel (10) is opened are performed. In the panel opening step (S3), at least one side of the upper panel (10) and the lower panel (20) is moved to open the loading space part (3).

When an active opening mode is set in the mode determination step (S2), as illustrated in FIGS. 7A and 7B, the obstacle (4) may be automatically sensed by the sensor unit (60), and the actuators of the main body connection part (30) and the panel connection part (40) may be controlled by the control unit (70) to automatically open the trunk cover (1) for a vehicle according to an aspect of the present invention. Also, when a passive opening mode is set in the mode determination step (S2), the upper panel (10) and the lower panel (20) may be manually opened as illustrated in FIGS. 2 and 3.

In the mode determination step (S2), when moving the upper panel (10), any one of a first mode (S2-1) In which the lower panel (20) is maintained in the state of being hung by its own weight, a second mode (S2-2) In which the lower panel (20) is moved at a set speed so as to be folded toward the upper panel (10), and a third mode (S2-3) in which the relative angle between the upper panel (10) and the lower panel (20) is constantly maintained may be additionally set.

According to the first mode (S2-1), while the upper panel (10) is rotated, the lower panel (20) may be maintained in the state of hanging due to its own weight regardless of the angle of the upper panel (10). When the reduced safety distance corresponding to a radius range ($r_4$) that corresponds a length of the upper panel (10) is secured from the obstacle to the rear (4), the opening operation may be stably performed (see FIG. 2).

According to the second mode (S2-2), while the upper panel (10) is rotated, the lower panel (20) is folded at the set speed toward the upper panel (10). Thus, the relative angle between the upper panel (10) and the lower panel (20) may be freely set in consideration of the position and the distance of the obstacle (4) and a size of the luggage. According to the second mode (S2-2), the rotation of the upper panel (10) and the rotation of the lower panel (20) may be performed at the same time to open the loading space part (3) more quickly.

According to the third mode (S2-3), the relative angle between the upper panel (10) and the lower panel (20) is constantly maintained. This means that a length formed by the upper panel (10) and the lower panel (20) Is constantly fixed to rt. The third mode (S2-3) is suitable for an instance in which a distance away from the obstacle (4) is stably established such as when outside and has the same opening line as the existing trunk cover.

In the case of being set to the active opening mode, the rotation and stopping operation of the upper panel (10) and the lower panel (20) are performed by connecting with the signal of the sensor unit (60), and in the case of being set to the passive opening mode, the rotation and stopping operation may be performed by the user's determination. In the case of being set to the active opening mode, the determination may be made with priority in order of the first mode (S2-1), the second mode (S2-2), and the third mode (S2-3) according to whether or not an obstacle (4) is interfering, and a suitable one of the first mode (S2-1), the second mode (S2-2), and the third mode (S2-3) for the position and the distance of the obstacle (4) may be performed in the preset state.

The panel opening step (S3) includes a first opening step (S3-1) In which the loading space part (3) is opened while moving the upper panel (10). When the first opening step (S3-1) is performed, while the upper panel (10) is moved, when the user or the sensor unit (60) senses that the distance between the lower panel (20) and the obstacle (4) is within the set distance, the movement of the upper panel (10) Is stopped.

Also, if necessary, the panel opening step (S3) may further include a second opening step (S3-2) in which the lower panel (20) is moved after the first opening step (S3-1) to further open the loading space part (3). When the second opening step (S3-2) is performed, while the lower panel (20) is moved, when the user or the sensor unit (60) senses that the distance between the lower panel (20) and the obstacle (4) is within the set distance, the movement of the lower panel (20) is stopped.

Even if the position and distance of the obstacle (4) are previously sensed by using the sensor unit (60) in the mode determination step (S2) to preset the mode, the position and the distance of the obstacle (4) may be continuously sensed by the sensor unit (60) while performing the panel opening step (S3) as described above to more stably and efficiently perform the opening operation in consideration of variables such as the movement of the obstacle (4) during the opening operation.

In the trunk cover (1) for a vehicle and the opening method thereof according to an aspect of the present invention having the above-described configuration, the length ($r_1$) formed by the upper panel (10) and the lower panel (20) may not be constantly fixed but widely varies in consideration of the position and the distance of the obstacle (4) to open the trunk cover (1) for a vehicle. Thus, when opening the loading space part (3), the restrictions due to the interference with the obstacle (4) may be further reduced.

Therefore, by means of the trunk cover for a vehicle (1) and the opening method thereof according to an aspect of the present invention, it may be possible to prevent the conventional complication, in which the vehicle must be parked or stopped with sufficient space away from the obstacle (4) in consideration of the moving line of the trunk cover, and the inconvenience or accidents, which are caused by the interference with the traveling line of another vehicle because the distance from the obstacle to the rear (4) is further extended in the limited space, from occurring.

In the above description of aspects of the present invention, although the structure including the upper panel (10) and the lower panel (20) is disclosed, this is mainly to explain the concept of including the plurality of panels, but is not limited to only the two panels corresponding to the upper panel (10) and the lower panel (20). An aspect of the present invention includes an embodiment, in which other panels in addition to the upper panel (10) and the lower panel (20) are additionally provided to be constituted by three or more panels as long as the lengths of the plurality of panels are not constantly fixed but can be varied, and may not be limited to a specific structure and shape.

DESCRIPTION OF THE REFERENCE NUMERALS OR SYMBOLS

1: Trunk cover for vehicle
2: Vehicle
3: Loading space part
4: Obstacle
10: Upper panel
20: Lower panel
30: Main body connection part
40: Panel connection part
50: Angle maintenance part 60: Sensor unit
61: Rear sensor
62: Upper sensor
70: Control unit
71: Method setting part
72: Sensor signal input part
73: Operation determination part
74: Operation control part

The invention claimed is:

1. A trunk cover for a vehicle, comprising:
an upper panel covering one portion of a loading space part formed in the vehicle;
a lower panel disposed continuously with the upper panel and covering an other portion of the loading space part;
a main body connection part connecting the upper panel to a main body of the vehicle;
a panel connection part connecting the upper panel and the lower panel so that a length formed by the upper panel and the lower panel is variable when opening the loading space part;
a sensor unit comprising a rear sensor sensing an obstacle to the rear of the vehicle and an upper sensor sensing an obstacle above the vehicle; and
a control unit controlling a rotation angle of the upper panel according to a sensing signal of the sensor unit when opening the loading space part,
wherein the trunk cover is controlled, by the control unit, to open in:
  a) a first mode when the first mode is set, in the first mode the lower panel hangs freely from the panel connection part such that a rotation angle of the lower panel changes as the lower panel rotates freely due to gravity,
  b) a second mode when the second mode is set, in the second mode a rotation angle of the lower panel is controlled by the control unit to be folded towards the upper panel at a set speed, and
  c) a third mode when the third mode is set, in the third mode the control unit maintains a constant angle between the upper panel and the lower panel.

2. The trunk cover for the vehicle of claim 1, wherein the panel connection part comprises a hinge device rotatably connecting the lower panel to the upper panel.

3. The trunk cover for the vehicle of claim 1, wherein the control unit comprises:
a sensor signal input part for receiving an input of a signal sensed by the sensor unit;
an operation determination part for determining a rotation angle and order of the upper panel and the lower panel according to position information of the obstacle, which is input through the sensor signal input part; and
an operation control part for controlling an operation of the main body connection part or the panel connection part according to the results determined by the operation determination part.

4. An opening method of a trunk cover for a vehicle, comprising:
an opening standby step of installing an upper panel and a lower panel to cover a loading space part formed in a vehicle;
a mode determination step of determining a method in which the lower panel is operated while the upper panel is opened; and
a panel opening step of moving at least one side of the upper panel and the lower panel to open the loading space part, the panel opening step including:
  sensing, by a rear sensor of a sensor unit, an obstacle to the rear of the vehicle,
  sensing, by an upper sensor of the sensor unit, an obstacle above the vehicle, and
  controlling, by a control unit, a rotation angle of the upper panel
according to a sensing signal of the sensor unit when opening the loading space part,
wherein the trunk cover is controlled, by the control unit, to open in:
  a) a first mode when the first mode is set, in the first mode the lower panel hangs freely from the panel connection part such that a rotation angle of the lower panel changes as the lower panel rotates freely due to gravity,
  b) a second mode when the second mode is set, in the second mode a rotation angle of the lower panel is controlled by the control unit to be folded towards the upper panel at a set speed, and
  c) a third mode when the third mode is set, in the third mode the control unit maintains a constant angle between the upper panel and the lower panel.

5. The opening method of the trunk cover for the vehicle of claim 4, wherein in the mode determination step, when moving the upper panel, any one of a first mode in which the lower panel is maintained in a state of being hung by its own weight, a second mode in which the lower panel is moved at a set speed so as to be folded toward the upper panel, and a third mode in which a relative angle between the upper panel and the lower panel is constantly maintained is determined.

6. The opening method of the trunk cover for the vehicle of claim 4, wherein the panel opening step comprises a first opening step of moving the upper panel to open the loading space part.

7. The opening method of the trunk cover for the vehicle of claim 6, wherein in the first opening step, when moving the upper panel, when a distance between the upper panel or the lower panel and the obstacle is within a set distance, the movement of the upper panel is stopped.

8. The opening method of the trunk cover for the vehicle of claim 6, wherein the panel opening step further comprises a second opening step of moving the lower panel after the first opening step to further open the loading space part.

9. The opening method of the trunk cover for the vehicle of claim 8, wherein in the second opening step, when rotating the lower panel, when a distance between the upper panel or the lower panel and the obstacle is within the set distance, the rotation of the lower panel is stopped.

10. The opening method of the trunk cover for the vehicle of claim 7, wherein the panel opening step further comprises a second opening step of moving the lower panel after the first opening step to further open the loading space part.

* * * * *